(12) United States Patent
Vila et al.

(10) Patent No.: US 6,654,824 B1
(45) Date of Patent: Nov. 25, 2003

(54) HIGH-SPEED DYNAMIC MULTI-LANE DESKEWER

(75) Inventors: Diego Fernando Vila, Austin, TX (US); Marcus Sebastian Mateus, Austin, TX (US); Richard B. Umberhocker, Cedar Park, TX (US)

(73) Assignee: Crossroads Systems, Inc., Austin, TX (US)

( * ) Notice: Subject to any disclaimer, the term of this patent is extended or adjusted under 35 U.S.C. 154(b) by 184 days.

(21) Appl. No.: 09/682,665

(22) Filed: Oct. 3, 2001

Related U.S. Application Data

(60) Provisional application No. 60/315,466, filed on Aug. 28, 2001.

(51) Int. Cl.[7] .................................................. G06F 3/00
(52) U.S. Cl. ............................ 710/60; 710/52; 710/61; 713/400
(58) Field of Search ...................... 710/52–61; 713/400

(56) References Cited

U.S. PATENT DOCUMENTS 6,321,252 B1 * 11/2001 Bhola et al. ................. 709/204

* cited by examiner

Primary Examiner—Jeffrey Gaffin
Assistant Examiner—Justin Knapp
(74) Attorney, Agent, or Firm—Gray Cary Ware & Freidenrich, LLP

(57) ABSTRACT

Systems and methods for enabling data transfers over communications links having a plurality of lanes, wherein the lanes may have different transmission lengths (times.) In one embodiment, a plurality of buffers are each coupled to corresponding transmission lanes in a communications link. Each buffer is configured to reset corresponding read and write pointers to predetermined initial positions after a reset event. The pointers are kept in these positions until a test sequence symbol which is transmitted across the corresponding lane is received. When the test sequence symbol is received, the buffer begins to advance the associated write pointer with each received piece of data. After all of the buffers have received corresponding test sequence symbols, data is read out of the buffers, and the read pointers are advanced accordingly.

28 Claims, 11 Drawing Sheets

HIGH-SPEED DYNAMIC MULTI-LANE DESKEWER

CROSS REFERENCE TO RELATED APPLICATIONS

This application claims the benefit of U.S.C. 119(e) of provisional application Serial No. 60/315,466, filed on Aug. 28, 2001 entitled "High-Speed Dynamic Multi-Lane Deskewer" (Attorney Docket No. CROSS1420), which is hereby incorporated by reference as if set forth herein in its entirety.

BACKGROUND OF INVENTION

1. Field of the Invention

The invention relates generally to the transfer of data in data processing systems and more particularly to the transfer of data across multi-lane communications links wherein the transmission times of the respective lanes may be different.

2. Background of the Invention

Referring to FIG. 1, a point-to-point communications link consists of three basic elements: a transmitter 10; a communications medium 12; and a receiver 14. Generally speaking, transmitter 10 transmits data using a local clock signal. Receiver 14 likewise uses a local clock signal to receive the data, but this clock signal is local to the receiver, and not the transmitter. Put another way, the clock signal's used by transmitter 10 and receiver 14 are generated from different sources and are not identical. Transmitter 10 and receiver 14 can therefore be said to reside in different clock domains. (Each clock domain comprises the portion of the system in which the respective clock signal is used as the basis for transferring data or perform its respective operations.)

While the clock signals in each clock domain may be designed to have the same frequency, it is virtually impossible to generate identical clock signals in any two clock domains. Typically, there is a phase mismatch and a slight frequency mismatch between the clock signals. The phase difference between the two signals can easily be handled by inserting a buffer (sometimes referred to as an elastic buffer) in the communications link so that data is written to the buffer according to the clock signal of the transmitting domain and retrieved from the buffer according to clock signal of the receiving domain. The frequency mismatch may cause the amount of data in each buffer to gradually increase or decrease, potentially causing an overflow or underflow condition. If the data in the buffer were allowed to overflow or underflow, the data stream delivered by the communications link would be corrupted. The problem of buffer overflow/underflow in a single communications channel can be resolved through the use of fill words which are added to or deleted from an elastic buffer. Fill words are a set of predefined symbols which occupy positions in the data stream, but which do not carry any of the information being transferred. As the amount of data in the elastic buffer approaches an overflow condition, fill words can be deleted from the output data stream. This effectively allows the output to catch up with the input. As the amount of data in the elastic buffer approaches an underflow condition, fill words can be added to the output data stream. This effectively allows slows down the output so that the input can catch up with it.

This single-channel solution to the problem of buffer overflow/underflow cannot, however, be directly implemented in a multilane communications link. If each lane of the communications link were allowed to add or delete fill words as appropriate to relieve overflow or underflow conditions in that lane, the data stream in that lane would be skewed with respect to the data streams in the other lanes. Then, when the separate data streams were de-multiplexed into a single data stream at the receiving end of the communications link, the data symbols within the reconstructed data stream would be out of order, and the data stream would be corrupted. Another problem which arises in multi-lane communications links is that, even absent the effects of adding or deleting fill words, the data streams in the different lanes may be skewed with respect to each other. This skewing may be caused, in part, by phase differences in the clock signals which are used to transmit data in the different lanes. Even more pronounced skewing may be caused by differences in the transmission lengths of the different lanes. (Transmission length is used here to refer to the amount of time it takes for a piece of data to be transmitted over the length of the corresponding transmission lane.) As indicated above, the skewing of the data streams may result in corruption of the data at the receiving end of the communications link.

SUMMARY OF INVENTION

One or more of the problems outlined above may be solved by the various embodiments of the invention. Broadly speaking, the invention comprises systems and methods for enabling data transfers over multi-lane communications links, wherein each of the lanes may have a different transmission length. After a reset event, a test sequence comprising a plurality of test sequence symbols is transmitted over the communications link, with at least one of the test sequence symbols being transmitted over each of the transmission lanes. The data transmitted via each lane is examined at the receiving end of the communications link. The data received via a particular transmission lane is stored in a corresponding buffer only after a test sequence symbol is received from that lane. Once a test sequence symbol is received via each of the transmission lanes, data can begin to be read out of the buffers corresponding to each of the lanes. If the amount of data accumulated in any one of the buffers exceeds a predetermined maximum, all of the buffers are reset and a new test sequence must be transmitted over the communications link.

In one embodiment, a system comprises a plurality of buffers, each of which is coupled to one of a plurality of transmission lanes in a communications link. Each of the buffers is configured to reset corresponding read and write pointers to predetermined initial positions upon the occurrence of a reset event. Each buffer is configured to maintain these pointer positions until a test sequence symbol is received. After the test sequence symbol is detected, the write pointer is advanced by one storage location for each data symbol, so that the data symbols are consecutively stored in the buffer. Each buffer is also configured to assert an ALIGNED signal after the test sequence symbol is received. The ALIGNED signal from each of the buffers is conveyed to a controller. The controller is configured to assert a DESKEWED signal when the ALIGNED signals for all of the buffers are asserted. The DESKEWED signal is conveyed to each of the buffers and, when this signal is asserted, the reading of data out of each buffer is initiated, with the read pointer of each buffer trailing the corresponding write pointer by an amount which compensates for the corresponding transmission length skew.

In another embodiment, a method comprises providing a plurality of buffers, each of which corresponds to one of the transmission lanes of a multi-lane communications link. After a reset event, the data received via each of the transmission lanes is monitored to identify receipt of a test sequence symbol. After the test sequence symbol has been received via a particular transmission lane, subsequent data received via that lane is stored in the corresponding buffer. After test sequence symbols have been received via all of the transmission lanes in the communications link, data begins to be read out of each of the buffers. The data symbols are then reconstructed into a single data stream.

BRIEF DESCRIPTION OF DRAWINGS

Other objects and advantages of the invention may become apparent upon reading the following detailed description and upon reference to the accompanying drawings in which.

Figure 1:
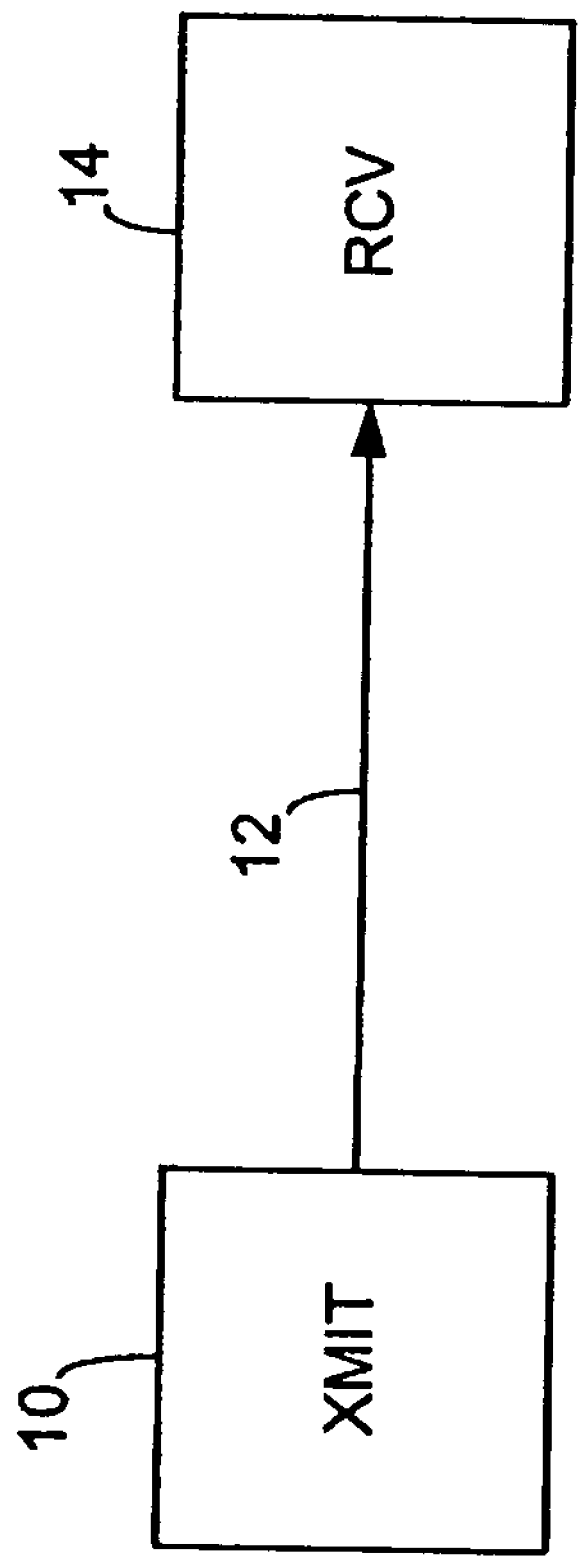
FIG. 1 is a diagram illustrating the communication of data from a transmitting device to a receiving device over a single data transmission lane.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for enabling data transfers over communications links having a plurality of lanes, wherein the lanes may have different transmission times/lengths. In one embodiment, a system comprises a plurality of elastic buffers, each of which is coupled to one of a plurality of transmission lanes in a communications link. After a reset event, the elastic buffers are configured to reset corresponding read and write pointers to predetermined initial positions. The pointers are kept in these positions until a test sequence which is transmitted across the communications link is received. The test sequence will be received by each buffer after a delay equivalent to the transmission length of the corresponding transmission lane. When the test sequence is received by a buffer, the buffer begins to advance the associated write pointer with each received piece of data. After all of the buffers have received the test sequence, data can be read out of the buffers, and the read pointers are advanced accordingly. If the test sequence has not been received by all of the buffers within a period corresponding to the maximum possible skew between the transmission lanes, the buffers reset their pointers to the initial positions and wait for another test sequence.

Figure 2:
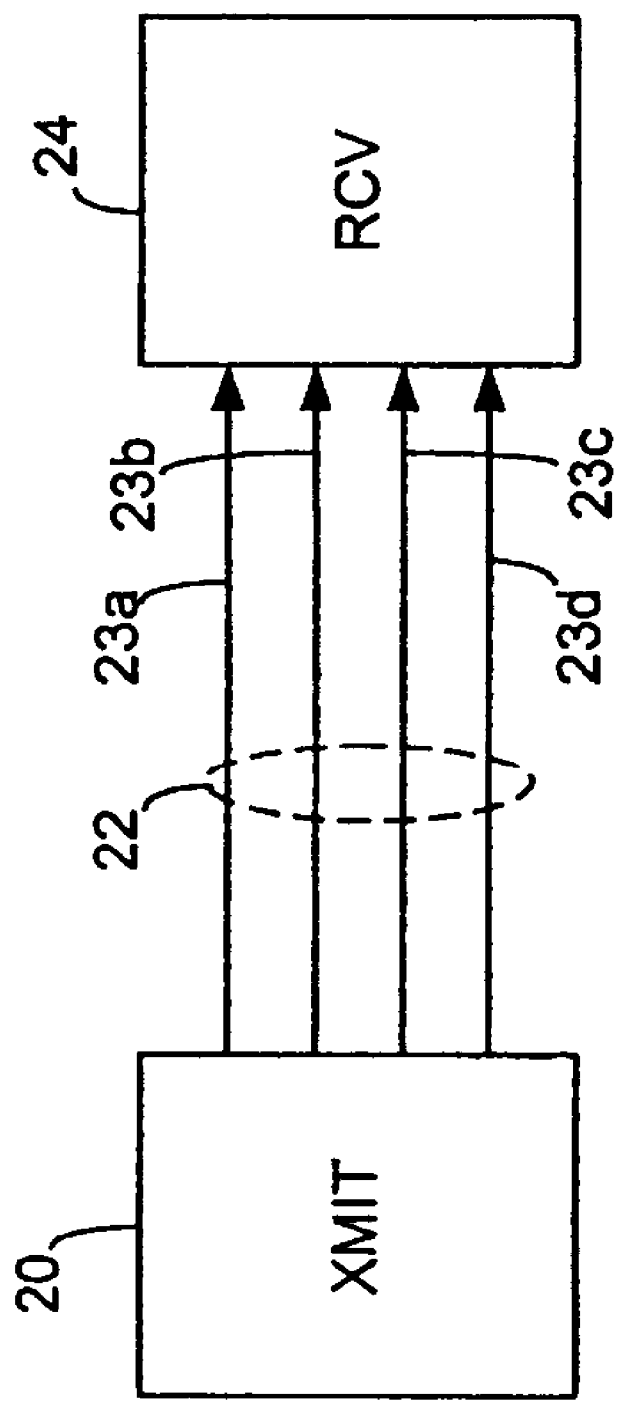
FIG. 2 is a diagram illustrating the communication of data from a transmitting device to a receiving device over a communications link having multiple data transmission lanes.

Referring to FIG. 2, a diagram illustrating a multi-lane communications link is shown. This diagram may be representative of any type of multi-lane communications link, including, but not limited to those found in systems implementing Fibre Channel, Infiniband or Ethernet protocols. Communications link 22 extends from transmitter 20 to receiver 24. Communications link 22 comprises a plurality of lanes 23. Serial data to be transmitted from transmitter 20 to receiver 24 is multiplexed to create a plurality of separate serial data streams. Each of these new serial data streams is transmitted over one of the lanes 23 of the communications link 22. When the new serial data streams are received by receiver 24, they are de-multiplexed to recreate the original serial data stream. This process is shown in more detail in FIGS. 3 and 4.

It should be noted that, for the purposes of this disclosure, identical items in the figures may be indicated by identical reference numerals followed by a lowercase letter, e.g., 23a, 23b, and so on. The items may be collectively referred to herein simply by the reference numeral, e.g., 23.

Figure 3:
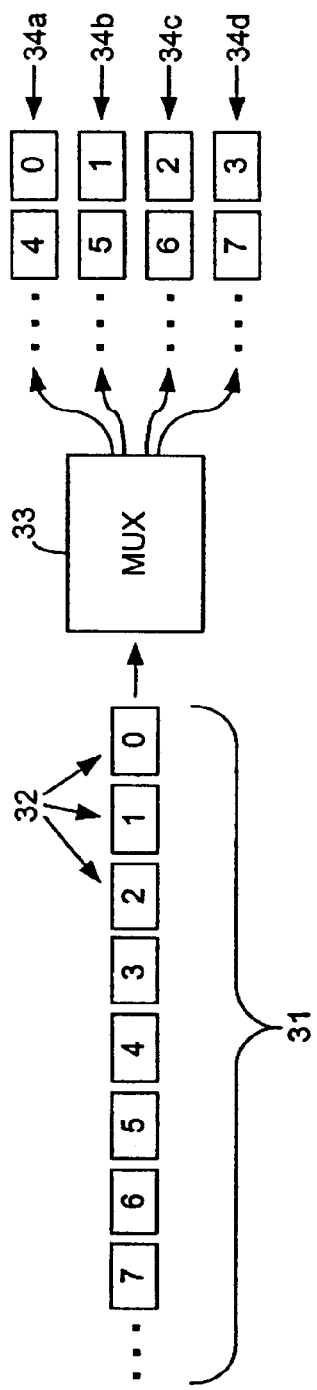
FIG. 3 is a diagram illustrating the multiplexing of a single serial data stream into a plurality of serial data streams suitable for transmission over a multilane communications link in one embodiment.

Referring to FIG. 3, a diagram illustrating the multiplexing of a single serial data stream into a plurality of serial data streams suitable for transmission over a multilane communications link is shown. A first serial stream of data 31 comprises a series of data symbols 32. (Data symbols is used here in a generic sense and, in various embodiments, may comprise bits, bytes, words, frames, or other pieces of data.) A multiplexer 33 operates on data stream 31 to produce a plurality of new serial data streams 34. Each one of the new serial streams can then be transmitted over one of the lanes in a multilane communications link. In the example of FIG. 3, four new data streams are created for transmission over a four-lane communications link. In this embodiment, multiplexer 33 is configured to distribute data symbols 32 among the lanes in a round-robin fashion. In other words, symbol 0 will be assigned to a first data stream, symbol 1 will be assigned to the next data stream, and so on. After a symbol is assigned to the last data stream, the process is repeated. As a result, each data stream comprises a first symbol and every fourth symbol after that. Thus, the first data stream includes symbols 0, 4, 8, etc., while the second data stream includes symbols 1, 5, 9, and so on.

Figure 4:
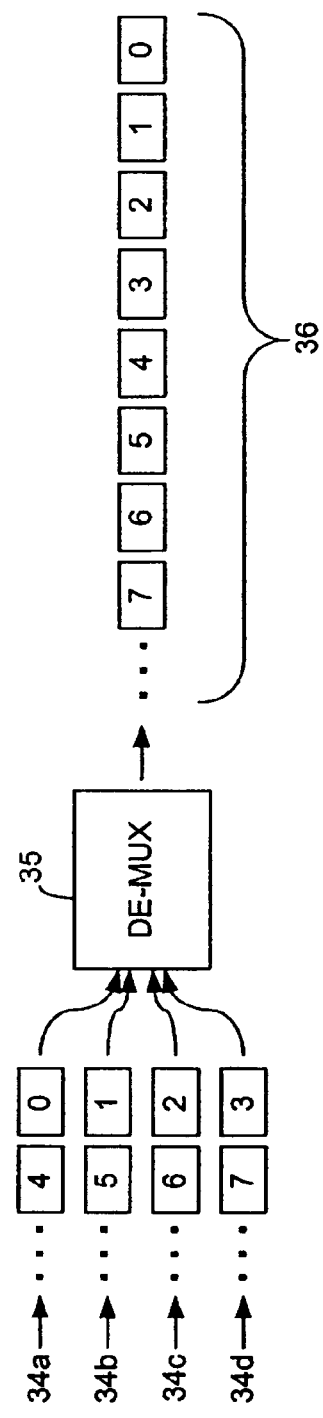
FIG. 4 is a diagram illustrating the de-multiplexing of multiple serial data streams received over a multi-lane communications link in one embodiment.

Referring to FIG. 4, a diagram illustrating the de-multiplexing of the multiple serial data streams received over a multi-lane communications link is shown. The plurality of serial data streams 34 which were produced by multiplexer 33 (see FIG. 3) are transmitted over the respective lanes of the communications link and are received by de-multiplexer 35. In this embodiment, de-multiplexer 35 reconstructs the original data stream by reading data symbols 32 from the data streams in a round-robin fashion. That is, a symbol is read from the first data stream, then the second, and so on, repeating after a symbol has been read from the each of the data streams. The data symbols are thereby re-ordered in their original sequence so that the single serial data stream 36 output by de-multiplexer 35 is essentially identical to the original serial data stream 31. It should be noted that data stream 36 is clocked by the read clock signal instead of the write clock signal, and may therefore have a slightly different frequency than data stream 31. The data streams may also differ as a result of the addition or deletion of fill words, as will be described in more detail below.

Figure 5:
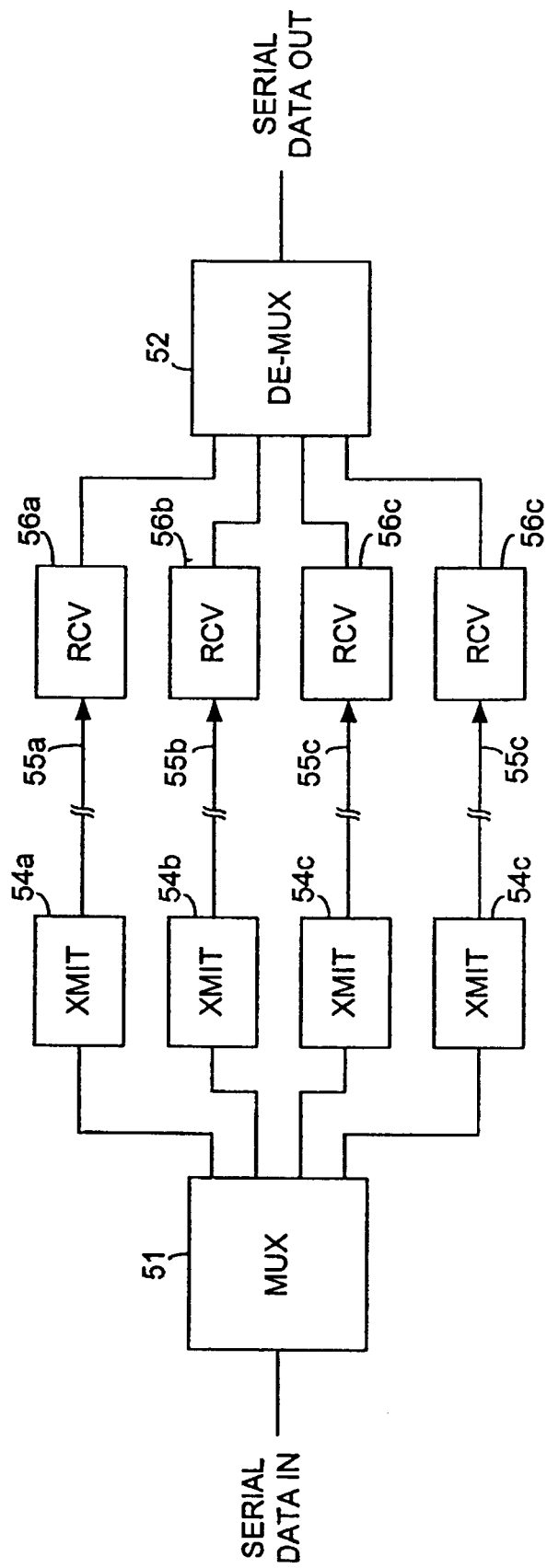
FIG. 5 is a diagram illustrating one embodiment of a multi-lane communications link.

Referring to FIG. 5, a diagram illustrating one embodiment of a multi-lane communications link according to the present invention is shown. In this figure, the communications link comprises a multiplexer 51 and a demultiplexer 52 and which are coupled by a plurality of transmission lanes. Each transmission lane comprises a transmitter 54, a receiver 56 and a transmission medium 55 which is coupled between them. As described above, multiplexer 51 is configured to transform an input serial data stream into a plurality of serial data streams. In this case, multiplexer 51 produces four data streams corresponding to the four transmission lanes of the communications link. Each of the new data streams is conveyed to one of the transmitters 54, which drives the data onto the corresponding transmission medium 55.

Multiplexer 51 is incorporated into a first device (or a first portion of a device) and is driven by a first clock signal. Transmitters 54 are normally incorporated into the same device (or portion of the device) as multiplexer 51, but typically do not use the same clock signal. Instead, a new clock signal is generated for each transmitter. While these new clock signals are normally generated from the first clock signal and have the same frequency as the first clock signal, they may be slightly out of phase with each other (e.g., as a result of variations in logic gate delays.) This phase difference is referred to as clock skew.

In addition to the phase differences caused by the use of different clock signals, there may be some skewing of the data streams with respect to each other as a result of the physical configurations of the transmission media which comprise the transmission lanes. For example, the transmission media for the different lanes may have slightly different lengths. For those of the transmission lanes which are slightly longer, data will take longer to travel from one end to the other. The skew which results from the differences between the transmission lanes adds to the skew resulting from phase differences in the clock signals. The total skew of the data streams may substantial and may, unless corrected, cause data symbols comprising the data streams to be reconstructed in a different order than they were originally transmitted. The resulting data stream would therefore be corrupted.

Figure 6:
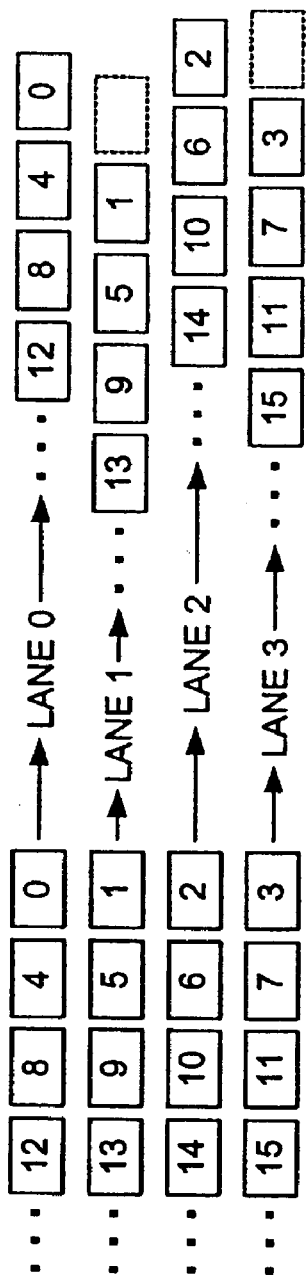
FIG. 6 is a diagram illustrating the skew resulting from the different transmission lengths of the lanes in the communications link in one embodiment.

Referring to FIG. 6, a diagram illustrating the skew resulting from the different transmission lengths of the lanes in the communications link is shown. A serial data stream (having data symbols ordered 0, 1, 2, . . . ) is multiplexed into four separate serial data streams. Each of the new data streams is transmitted over one of the four transmission lanes of a communications link. Each of the transmission lanes is assumed in this example to have a slightly different transmission length. After each of the new serial data streams travels the length of the corresponding transmission lane, it is skewed with respect to the other data streams by an amount corresponding to the differences in their respective transmission lengths. The skew is illustrated graphically by the respective positions of the data streams in the horizontal direction. The data stream corresponding to lane 2 is positioned farther to the right then the other data streams, indicating that the transmission length of this lane is shorter and that the data traveling via this lane arrives at the receiving device more quickly than the other data streams. Likewise, the data stream corresponding to lane 1 is farther to the left than the other data streams, indicating that the transmission length of lane 1 is longer than the other lanes and that the data stream carried over lane 1 arrives at the receiving device behind the other streams.

Figure 7:
FIG. 7 is a diagram illustrating the order of data symbols which may result from the de-multiplexing of data streams in which the skewing of the data streams is not corrected.

It is assumed for the purposes of this description that the data streams for the different transmission lanes will be de-multiplexed to form a single serial data stream. The de-multiplexing of these data streams is intended to reconstruct the serial data stream which was originally multiplexed and transmitted over the different transmission lanes of the communications link. If one of the data streams leads or lags behind the other data streams, the data symbols which make up the data stream may be shifted in the de-multiplexed data stream, thereby corrupting the final data stream. An example of this is illustrated in FIGS. 6 and 7.

Figure 8:
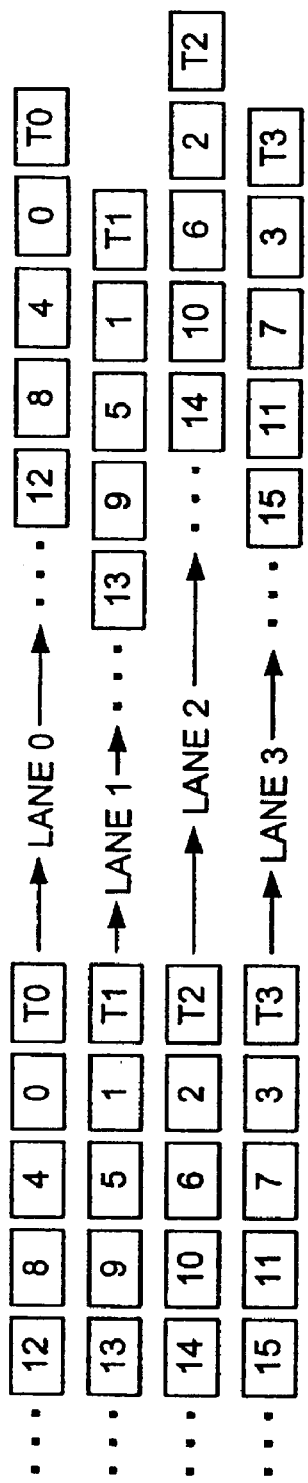
FIG. 8 is diagram illustrating the transmission of data streams incorporating a test sequence in one embodiment.

In FIG. 6, it can be seen that the data stream of lane 2 leads the other data streams, followed by lane 0, then lane 3, and finally lane 1. For the purposes of illustrating the effects of the skewing out the data streams, data symbols which precede symbols 1 and 3 are shown using dotted lines. When the data streams are de-multiplexed, a data symbol will be read from each of the lanes in a round-robin fashion. Thus, a symbol will be taken from lane 0, then lane 1, then lane 2, then lane 3. These symbols, in this order, will form a portion of the de-multiplexed data stream. This will be repeated so that each of the data symbols in the multiplexed data streams is placed into the single, de-multiplexed data stream. Thus, the de-multiplexer first takes the first data symbol (0) from lane 0, the first symbol (represented by the dotted line) from lane 1, the first symbol (2) from lane 2, and the first symbol from lane 3 (represented by a dotted line.) it has a result, the order of the data symbols in the de-multiplexed data stream will be as shown in FIG. 7 (0, _, 2, _, 4, 1, 6, 3, 8 . . . ) Obviously, this is not the original order of the data symbols. The data stream has therefore been corrupted by the skewing of the multiplexed data streams and subsequent reconstruction of the output data stream. (It should be noted that the data streams are illustrated as being in phase prior to transmission over the communications link any clock skew would add to the skewing of the data streams at the receiving device.)Referring to FIGS. 8–12, a plurality of diagrams illustrating how the present systems and methods avoid corruption of data resulting from skewing of the data streams are shown. Referring to FIG. 8, a diagram illustrating the transmission of data streams incorporating a test sequence is shown. The data symbols in the diagram are numbered according to their respective order in the original serial data stream. The test sequence comprises a plurality of symbols (T0–T3) which lead the data symbols in each data stream. In this embodiment, a single test sequence symbol leads each of the data streams. The symbol is the same for each of the data streams. (In other embodiments, more than one symbol can be used, and the symbols need not be the same.) After the data streams are transmitted via the respective transmission lanes, the data streams are skewed because of the different transmission lengths of the different lanes.

Figure 9:
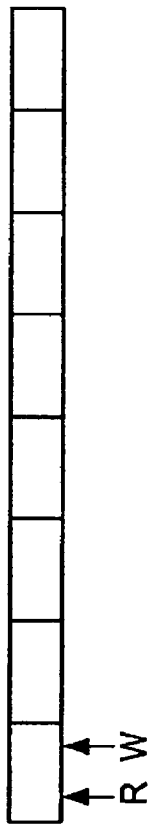
FIG. 9 is a diagram illustrating a buffer as implemented in one embodiment of the deskew buffer system.

Referring to FIG. 9, a diagram illustrating a buffer as implemented in one embodiment of the deskew buffer system is shown. In this embodiment, the buffer has eight storage locations. Each location is configured to store one data symbol. Each data symbol comprises one byte of data. (In other embodiments, the buffer can be configured with a different number of storage locations which can hold different amounts of data.) The buffer has two pointers that are associated with it a write pointer (W) and a read pointer (R.) The write pointer indicates the storage location in which the next data symbol to be stored will be written. The read pointer indicates the storage location from which the next data symbol will be read. The buffer is circularly accessed, so that the pointers advance from one storage location to the next, wrapping from the last storage location back to the first storage location. (In other embodiments, a FIFO can be used instead of a circular buffer.)It should be noted that, although the buffers illustrated in FIGS. 9, 11–13 are depicted as initially containing no data, the buffers need not be cleared upon the occurrence of a reset event. Because the read and write pointers are configured to allow only storage locations containing valid data (i.e., that received after a test sequence) to be read, it does not matter what values are stored in the buffer in normal operation, they will be overwritten with valid data before they are read out of the buffer.

Following a reset event (e.g., manual initiation of a reset by a user,) the pointers associated with each buffer are reset. Each of the pointers is set to indicate a predetermined initial storage location. The read and write pointers are maintained in these initial positions until the test sequence is received by the corresponding buffer. After the test sequence is received in a particular buffer, the write pointer corresponding to that buffer is advanced by one storage location for each data symbol which is received. Once all of the buffers have received the test sequence (at least one symbol of which was transmitted over the corresponding transmission lane,) the read pointer for each of the buffers is advanced by one storage location for each data symbol which is read from the buffer.

Figure 10:
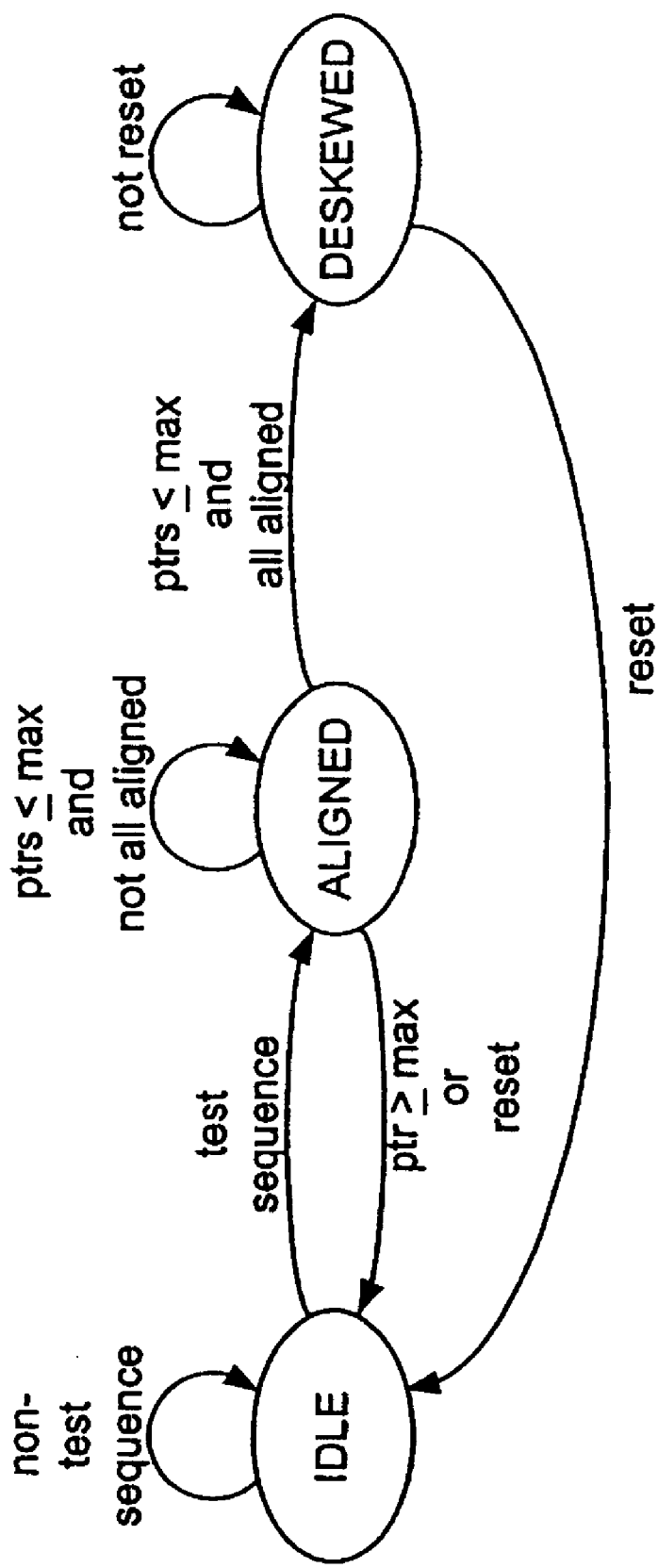
FIG. 10 is a state diagram illustrating the operation of the buffers in one embodiment.

Referring to FIG. 10, a state diagram illustrating the operation of the buffers in one embodiment is shown. After a reset event, the buffer is in the idle state. In this state, the buffer receives data via the corresponding transmission lane. The buffer does not accumulate data while it is in the idle state. As each data symbol is received, the buffer determines whether or not the symbol is a test sequence symbol. If the data symbol is not a test sequence symbol, the buffer remains in the idle state. If the symbol is a test sequence symbol, the buffer transitions to the ALIGNED state.

While the buffer is in the ALIGNED state, it accumulates data. In other words, as each data symbol is received from the corresponding transmission lane, it is stored in the buffer. Although data symbols are being stored in the buffer as they are received, the stored data symbols are not read out of the buffer while it is in the ALIGNED state. The buffer remains in the ALIGNED state until either all of the buffers are in the ALIGNED state or the number of data symbols stored in the buffer reaches a predetermined maximum number. If the number of data symbols stored in the buffer reaches the maximum threshold, the buffer is returned to the idle state and the pointers are returned to their initial positions. (This is because, if the buffer reaches the maximum threshold, it can be assumed that the skew between the data streams carried on the different transmission lanes is too large to be handled by the buffer, and operation will not be successful.) When all of the buffers reach the ALIGNED state (and none of the buffers has reached its maximum threshold,) the buffers are all transitioned to the DESKEWED state. When the buffers are in the DESKEWED state, the data symbols which have been stored in the buffers are read out, and new data symbols continue to be written to the buffers. All of the buffers continue to operate in the DESKEWED state until a reset event occurs. This will cause each of the buffers to the transition to back to the idle state. It should be noted that a reset event which occurs while a buffer is in the ALIGNED state will cause that buffer to return to the idle state. (Although not explicitly shown in the drawing, reset events may include not only a manual reset, but also errors and events which cause one or more of the buffers to no longer be aligned.)Referring to FIG. 11, a diagram illustrating the positions of read and write pointers associated with a buffer and the accumulation of data within the buffer is shown. In this figure, a buffer is illustrated as a horizontal array of blocks (storage locations.) Each of the illustrated arrays represents the same buffer at different points in time. The operation of the buffer will be described with reference to the data streams and corresponding timing illustrated in FIG. 8, in which the data stream corresponding to lane 2 leads the data streams of lanes 0 and 3 by one clock cycle, and the data stream of lane 1 by two clock cycles.

Referring again to FIG. 11, the buffer is shown at times t=N, through t=N+5, where t is the time in clock cycles and it is assumed that one data symbol is transferred per clock cycle. The buffer corresponds to transmission lane 0. At some time prior to or at t=N, the buffer system is reset. This causes the read and write pointers of the buffer to be reset to predetermined initial positions (the first storage location in the buffer.) The pointers remain in these positions as each data symbol is received, until the received data symbol is a test sequence symbol. In this figure, the test sequence symbol is received at time t=N+1. When the test sequence symbol is received, the buffer is in the ALIGNED state. As subsequent data symbols are received, the write pointer is advanced so that each received data symbol will be stored in the buffer. It can be seen that, at times t=N+2 and t=N+3, data symbols 0 and 4 are received and stored in the buffer. (Some embodiments may be configured to store the test sequence symbol, rather than the following data symbol, in the first storage location.) As long as the buffer is in the ALIGNED state rather than the DESKEWED state (i.e., not all of the buffers are aligned,) the read pointer remains in its initial position.

When all of the buffers have reached the ALIGNED state, the buffer system is in the DESKEWED state, and data can begin to be read out of the buffers. Referring to FIG. 8, it can be seen that lane 2 becomes aligned at t=N, lanes 0 and 3 become aligned at t=N+1, and lane 1 becomes aligned at t=N+2. Consequently, the buffer system becomes deskewed at time t=N+3. Thus, at time t=N+3, data is written to the storage location indicated by the write pointer, and data is read from the storage location indicated by the read pointer. As each data symbol is written to and read from the buffer, the respective pointers are advanced. The advancement of the pointers is shown through time t=N+5.

Figure 11:
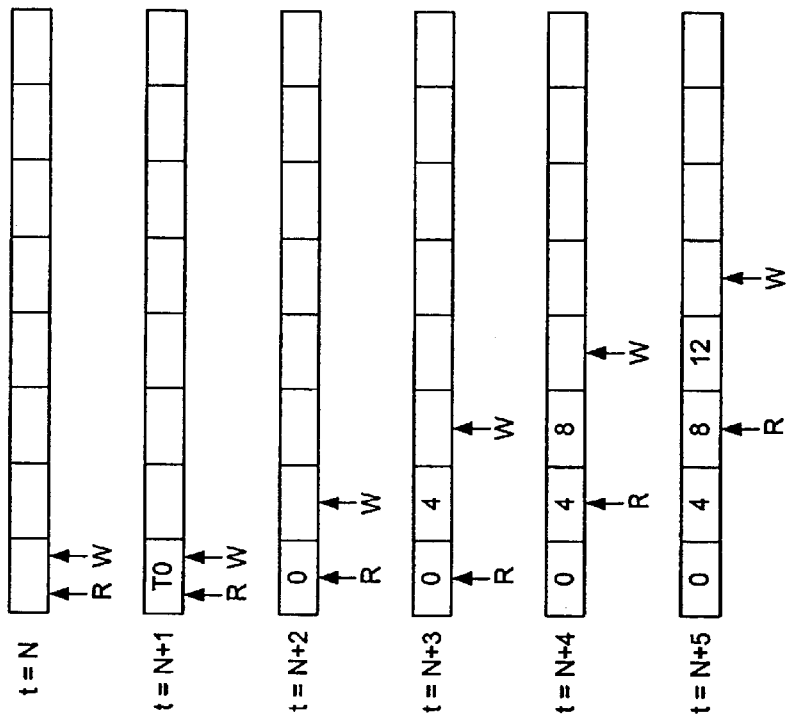
FIG. 11 is a diagram illustrating the positions of read and write pointers associated with a buffer and the accumulation of data within the buffer in one embodiment.

It should be noted that, while FIG. 11 shows the read and write pointers being advanced by the same number of storage locations, data is sometimes written to the buffer at a first clock frequency and read from the buffer at a second clock frequency. Consequently, the spacing between the pointers may vary during normal operation of the system. Some embodiments of the system may compensate for the different clock frequencies (and correspondingly different data rates) by adding or deleting fill words, as appropriate. This may be performed in an elastic buffer. In a preferred embodiment, an elastic buffer is implemented upstream from the deskewing system so that the data is copied into and read out of the deskew buffers at the same rates. It may be necessary in either instance to ensure that fill words are added to or deleted from all of the transmission lanes at essentially the same time in order to prevent skewing of the respective data streams and resulting corruption of the data.

Figure 12:
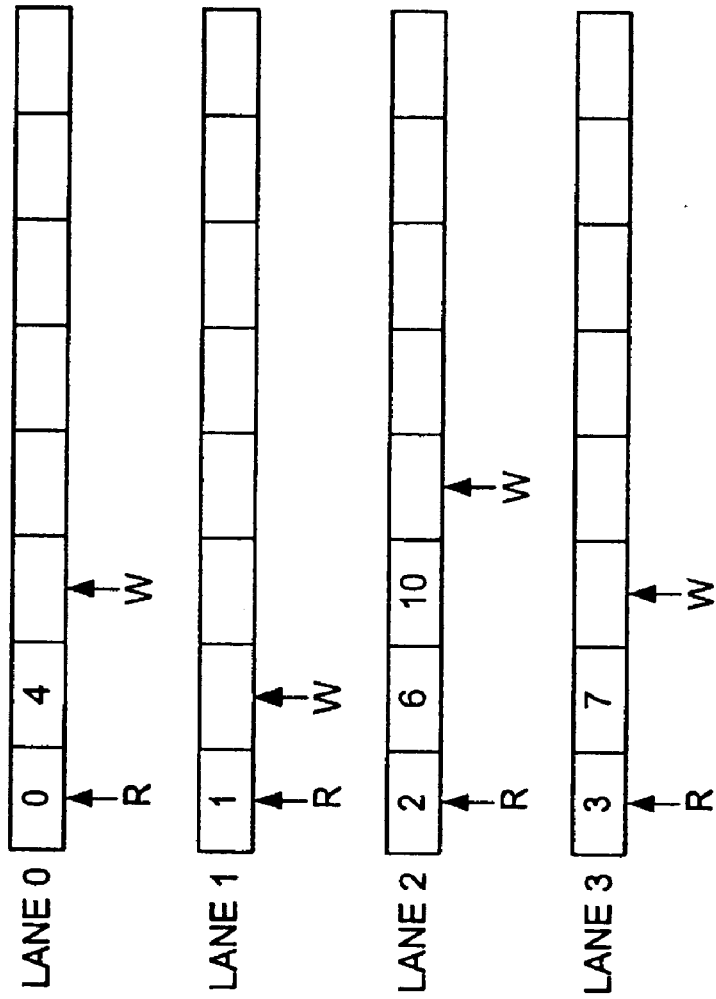
FIG. 12 is a diagram illustrating the positions of the read and write pointers corresponding to each of the buffers at one point in time is shown for one embodiment.

Referring to FIG. 12, a diagram illustrating the positions of the read and write pointers corresponding to each of the buffers at one point in time is shown for one embodiment. In this figure, each horizontal array represents a buffer corresponding to a different transmission lane. The timing of the data streams associated with each transmission lane is as shown in FIG. 8. The positions of the respective pointers and the data symbols which occupy each storage location correspond to time t=N+3 (at which lane 1 becomes aligned and all of the buffers become deskewed.) It can be seen that the write pointer associated with lane 0 leads the corresponding read pointer by two storage locations. The write pointers associated with lanes 1–3 lead the corresponding read pointers by one, three and two storage locations, respectively. As noted above, each of the buffers is in an ALIGNED state at this point in time. Collectively, they are in the DESKEWED state. The illustrated spacings between the write and read pointers are maintained as data is transferred in and out of the buffer (absent the effects of different data rates into and out of the buffers.) Thus, in this embodiment, the write pointer of lane 0 will remain two storage locations ahead of the read pointer. Lanes 1–3 will likewise maintain their pointer spacings.

Figure 13:
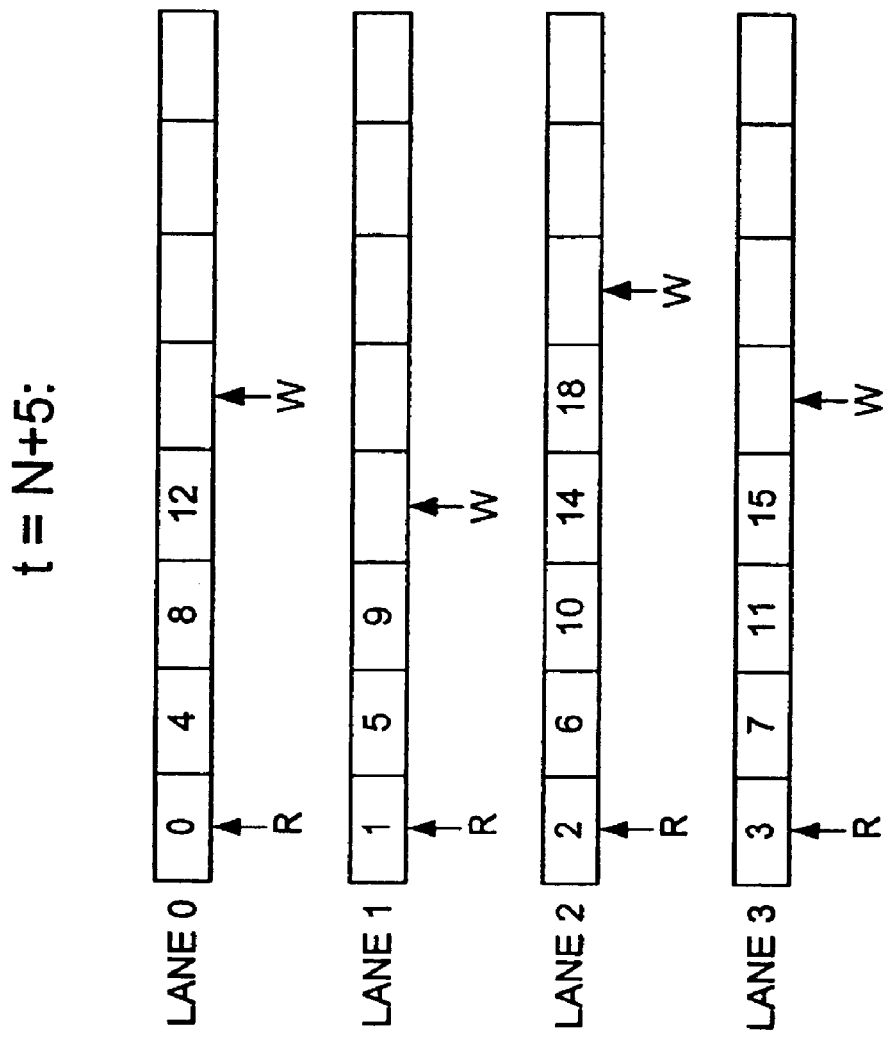
FIG. 13 is a diagram illustrating the positions of the read and write pointers corresponding to each of the buffers at one point in time is shown for another embodiment.

Referring to FIG. 13, a diagram illustrating the positions of the read and write pointers corresponding to each of the buffers at one point in time is shown for another embodiment. In this figure, each horizontal array again represents a buffer corresponding to a different transmission lane, and the timing of the data streams associated with each transmission lane is as shown in FIG. 8. The figure corresponds to time t=N+5. It can be seen that the write pointers in this figure are advanced two storage locations beyond the positions shown in FIG. 12, while the read pointers still indicate the first storage location of each buffer. This is a result of the fact that the write pointers are allowed in this embodiment to advance two additional clock cycles (two additional data symbols) before reads of the data from the buffers are initiated. This effectively increases the amount of data in each of the buffers during normal operation by two data symbols. Thus, instead of having between one and three data symbols stored in each buffer, there are between three and five data symbols in each buffer.

The additional data is accumulated in the buffers in this embodiment in order to allow them to operate in a range at which they are near half of their capacities. Put another way, the average amount of data in the buffers is approximately half (within one storage location) of the buffers" capacities. This may be especially desirable in systems in which the buffers also serve as elastic buffers. In this situation, the amount of data in the buffers may vary as a result of differences in the rates at which data is written to and read from the buffers, and the addition or deletion of fill words to or from the buffers to compensate for the data rate differences. By starting to read data from the buffers when they are around half full, there is room for the amount of data to increase or decrease by two or three data symbols without causing any of the buffers to overflow or underflow.

It should be noted that the increase in the initial amount of data in each buffer can be provided in several ways. For example, the buffer system may be configured to initiate reads from the buffers at a predetermined number of clock cycles (data symbols) after receiving the test sequence symbol. In another embodiment, the buffer system may instead be configured to determine the difference between the positions of the write pointers and to allow the write pointers to advance by a number of storage locations which will effectively center the write pointers in the buffers. This will leave an equal number of storage locations (plus or minus one) for: the buffer with the greatest amount of data to increase; and the buffer with the least amount of data to decrease.

Figure 14:
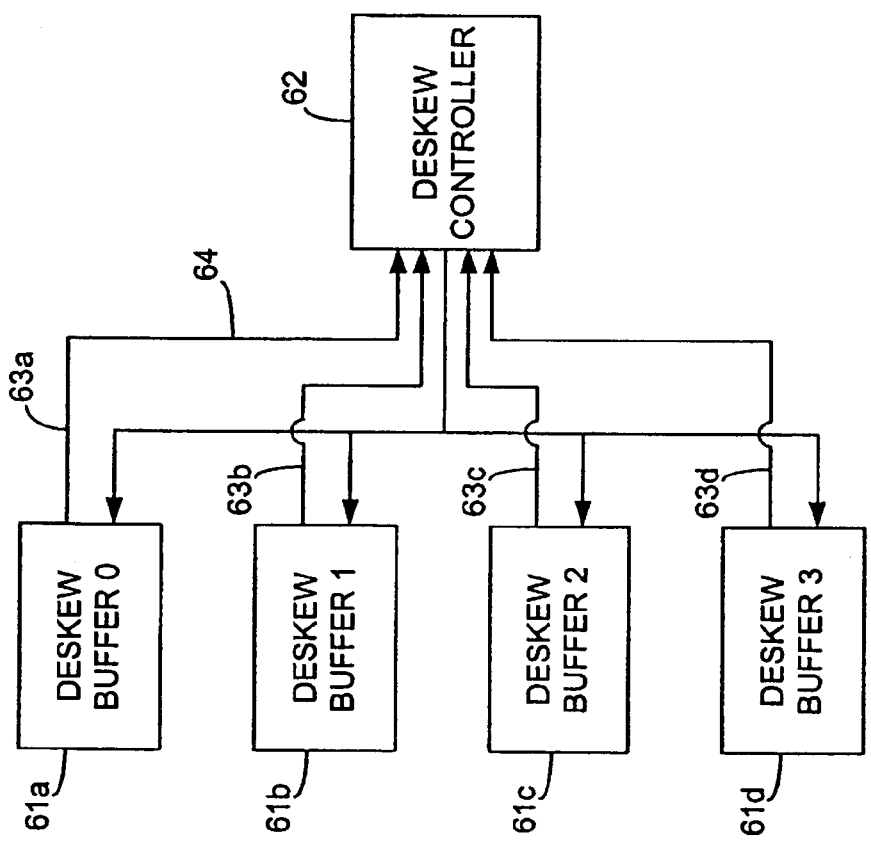
FIG. 14 is a diagram illustrating the configuration of the buffer system in one embodiment.

Referring to FIG. 14, a diagram illustrating the configuration of the buffer system in one embodiment is shown. The system illustrated in this figure is configured to be coupled to a communications link having four transmission lanes. It should be noted that the system is scalable and can be used with multi-lane communications links having more or less than four lanes.

The buffer system includes a buffer corresponding to each of the transmission lanes. In the illustrated system, buffer 61$a$ is coupled to transmission lane 0, buffer 61$b$ is coupled to transmission lane 1, buffer 61$c$ is coupled to transmission lane 2, and buffer 61$d$ is coupled to transmission lane 3. Each buffer 61 is configured to receive data from the corresponding transmission lane. The data is written into the corresponding buffer at a first data rate and is read out of the buffer at a second rate. The input and output data rates may be based on different clock signals and may vary somewhat. The data is conveyed from buffers 61 to a demultiplexer which reassembles the data from each of the buffers into a single serial data stream.

In the illustrated embodiment, each buffer 61 has two signal lines coupled between it and a deskew controller 62. The first line 63 is configured to convey an ALIGNED signal from buffers 61 to deskew controller 62. This signal is asserted when the corresponding buffer receives the test sequence. After the ALIGNED signal has been asserted by each of buffers 61$a$–61$d$ on lines 63$a$–63$d$ (and none of them have reached a maximum capacity,) deskew controller 62 is configured to assert a DESKEWED signal on line 64. When the DESKEWED signal is asserted, reads are initiated from all of buffers 61.

It should be noted that, while the embodiment illustrated in FIG. 14 comprises a single deskew controller coupled to each of the buffers, wherein these components are configured to convey signals to each other as described above, other embodiments may vary. For example, the functions of the deskew controller may be distributed among the buffers so that equivalent signals are transmitted directly between the buffers, rather than to a central controller. As another example, the buffers may selectively inhibit reads and writes of data to the buffers rather than manipulating pointers. In yet another example, other embodiments may employ FIFOs rather than circular buffers in which read and write pointers are manipulated to control their respective functions.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:
   receiving data from each of a plurality of transmission lanes;
   for each transmission lane,
   maintaining a write pointer for a corresponding buffer in a predetermined
   position until a test sequence is received via the transmission lane,
   in response to receiving the test sequence, advancing the write pointer as data is received from the transmission lane, and
   writing data from the transmission lane into a corresponding buffer at a location indicated by the write pointer.

2. The method of claim 1 further comprising determining when the test sequence has been received via all of the plurality of transmission lanes and, for each transmission lane, advancing a read pointer for the corresponding buffer and reading data from the buffer.

3. The method of claim 2 further comprising delaying for a period equivalent to one or more data symbols before advancing the read pointer for the buffer corresponding to each of the transmission lanes.

4. The method of claim 3 wherein the delay comprises a predetermined delay.

5. The method of claim 1 further comprising determining a delay at which the average amount of data in each of the buffers is approximately half the capacity of each buffer.

6. The method of claim 5 further comprising de-multiplexing the data read from the buffers to form a single data stream.

7. The method of claim 1 wherein writing data from the transmission lane into a corresponding buffer at the location indicated by the write pointer comprises overwriting a first storage location until the test sequence is received and then advancing.

8. The method of claim 1 wherein writing data to the buffers is performed at a rate determined by a first clock signal and reading data from the buffers is performed at a rate determined by a second clock signal.

9. A method comprising:
   for each of a plurality of transmission lanes in a communications link,
   receiving data via the transmission lane, and
   following a reset event, delaying until a test sequence is received via the transmission lane and writing the data into a corresponding buffer after the test sequence is received via the transmission lane;
   determining when the test sequence has been received via all of the plurality of transmission lanes; and
   in response to determining that the test sequence has been received via all of the plurality of transmission lanes, beginning to read data from each buffer.

10. The method of claim 9 further comprising delaying for a period equivalent to one or more data symbols before advancing the read pointer for the buffer corresponding to each of the transmission lanes.

11. The method of claim 10 wherein the delay comprises a predetermined delay.

12. The method of claim 10 further comprising determining a delay at which the average amount of data in each of the buffers is approximately half the capacity of each buffer.

13. The method of claim 9 further comprising de-multiplexing the data read from the buffers to form a single data stream.

14. A system implemented in a communications link having a plurality of transmission lanes comprising:
   a plurality of buffers, wherein each buffer is coupled to receive data from one of the transmission lanes and wherein each buffer has an associated write pointer; and
   one or more controllers, wherein for each buffer and the associated write pointer, the controllers are configured to set the write pointer to a predetermined position upon occurrence of a reset event, to maintain the write pointer in the predetermined position until a test sequence is received by the buffer, and after the test sequence is received by the buffer, to advance the write pointer as data is received by the buffer.

15. The system of claim 14 wherein the one or more controllers are configured to determine when the test sequence has been received by all of the buffers and to initiate reading of data from the buffers in response to determining that the test sequence has been received by all of the buffers.

16. The system of claim 15 wherein the one or more controllers are configured to delay for a predetermined amount of time before reading data from the buffers.

17. The system of claim 15 wherein the one or more controllers are configured to determine a delay which will cause the average amount of data in the buffers to be approximately half of the capacity of the buffers, wherein the one or more controllers are further configured to implement the delay before reading data from the buffers.

18. The system of claim 15 further comprising a de-multiplexer coupled to receive the data from the buffers and configured to reconstruct a single data stream from the data.

19. The system of claim 14 wherein each of the buffers comprises a circular buffer.

20. The system of claim 14 wherein the one or more controllers comprise a single controller which is configured to monitor each of the buffers and to determine when the test sequence is received by the buffer.

21. The system of claim 14 further comprising a plurality of storage locations, wherein each of the storage locations is configured to store a corresponding one of the write pointers.

22. The system of claim 14 wherein each of the buffers is configured to assert a first signal in response to receiving the test sequence.

23. The system of claim 22 wherein the one or more controllers are configured to receive the first signal from each of the buffers and wherein the one or more controllers are configured to assert a second signal in response to the first signals from all of the buffers being asserted.

24. The system of claim 14 wherein data is read from the buffers in response to the one or more controllers asserting the second signal.

25. The system of claim 14 wherein the communications link comprises an Infiniband communications link.

26. The system of claim 14 wherein the communications link comprises a Fibre Channel communications link.

27. The system of claim 14 wherein the communications link comprises an Ethernet communications link.

28. The system of claim 14 wherein the buffers are further configured to be reset if the amount of data in any of the buffers exceeds a predetermined maximum before the test sequence has been received by all of the buffers.

* * * * *